United States Patent [19]

Imanaka et al.

[11] Patent Number: 5,216,646
[45] Date of Patent: Jun. 1, 1993

[54] TRACKING SYSTEM IN RECORDING/REPRODUCING APPARATUS

[75] Inventors: Ryoichi Imanaka; Yukinori Okazaki, both of Hirakata, Japan

[73] Assignee: Matsushita Electric Industrial Co., Ltd., Osaka, Japan

[21] Appl. No.: 435,037

[22] Filed: Nov. 13, 1989

[30] Foreign Application Priority Data

Nov. 16, 1988 [JP] Japan .................... 63-289335

[51] Int. Cl.⁵ .............................................. G11B 7/007
[52] U.S. Cl. .............................. 369/44.26; 369/44.35; 369/275.3
[58] Field of Search ............... 369/44.13, 44.34, 44.11, 369/44.25, 44.23, 44.26, 44.29, 44.14, 44.32, 44.35, 275.1, 275.4, 275.3, 43, 47, 51, 54, 56, 58, 59, 100, 109, 110, 111, 116, 32, 44.38; 358/342

[56] References Cited

U.S. PATENT DOCUMENTS

| | | | |
|---|---|---|---|
| 4,322,836 | 3/1982 | Kinjo et al. | 369/43 |
| 4,358,774 | 11/1982 | Wilkinson | 369/44.13 |
| 4,748,609 | 5/1988 | Yonezawa et al. | 369/105 X |
| 4,862,439 | 8/1989 | Ando et al. | 369/56 |
| 4,965,781 | 10/1990 | Akiyama et al. | 369/44.37 |
| 4,967,403 | 10/1990 | Ogawa et al. | 369/275.3 |
| 4,980,882 | 12/1990 | Baer et al. | 369/44.26 |
| 5,038,339 | 8/1991 | Pasman et al. | 369/275.3 |

FOREIGN PATENT DOCUMENTS

| | | |
|---|---|---|
| 59-18771 | 4/1984 | Japan . |
| 0158045 | 7/1986 | Japan ................. 369/44.14 |
| 63-43812 | 9/1988 | Japan . |

*Primary Examiner*—Aristotelis Psitos
*Assistant Examiner*—P. W. Huber
*Attorney, Agent, or Firm*—Stevens, Davis, Miller & Mosher

[57] ABSTRACT

The present invention generally relates to optical recording/reproducing apparatus, and relates particularly to a tracking system therefor. Tracking pit rows are provided on opposite sides of an information signal recording area. The frequencies of the tracking pit rows differ from each other, such that tracking servo normalizes a detected difference in amplitude between the reproduced signals of the tracking pit rows, resulting in improved tracking accuracy.

8 Claims, 3 Drawing Sheets

TRACKING SYSTEM IN RECORDING/REPRODUCING APPARATUS

BACKGROUND OF THE INVENTION

The present invention generally relates to an optical disk and a recording/reproducing apparatus therefor, and particularly relates to a tracking system in the recording/reproducing apparatus.

A pre-groove is formed in a writable optical disk so that an information signal can be recorded efficiently on the optical disk by means of a light while the light beam tracks on the pre-groove. As a system of making a light beam perform tracking on a pre-groove formed in an optical disk, a far field system or a sample tracking servo system using wobbled pits has been conventionally used.

In the far field system, however, there has been a disadvantage in that an offset is sometimes generated in a tracking error signal. Further, in the sample tracking servo system, on the other hand, there has been a disadvantage in that a control circuit is complicated and a servo frequency band is limited (for example, Japanese Patent Post-examined Publication Nos. 59-18771 and 63-43812).

SUMMARY OF THE INVENTION

It is therefore an object of the present invention to eliminate the foregoing disadvantages in the prior art systems.

It is another object of the present invention to provide a tracking system in which a tracking error signal is stably detected and a tracking servo circuit can be relatively easily formed.

In the recording/reproducing apparatus using a writable optical disk according to the present invention, two tracking pit rows different in frequency from each other are formed in place of the pre-groove so as to sandwich a recording track therebetween, and the two tracking pit rows are detected by a single light beam so as to detect a difference in reproduced level between the two tracking pit rows by utilizing the frequency difference therebetween so that the position of the light beam is detected to thereby perform tracking servo. In this case, the respective frequencies of the two tracking pit rows and the frequency difference therebetween are selected so as to minimize the influence on an information signal to be recorded on the recording track.

In the recording optical disk according to the present invention, since two tracking pit rows different in frequency from each other are formed, it is possible to detect the center of the two tracking pit rows by irradiating the two tracking pit rows with a single light beam, and it is possible to record/reproduce an information signal onto/from a recording track formed in the center between the two tracking pit rows while making the light beam perform tracking on the recording track.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Now, referring to the accompanying drawings, description will be made on the preferred embodiments of the present invention.

Figure 1:
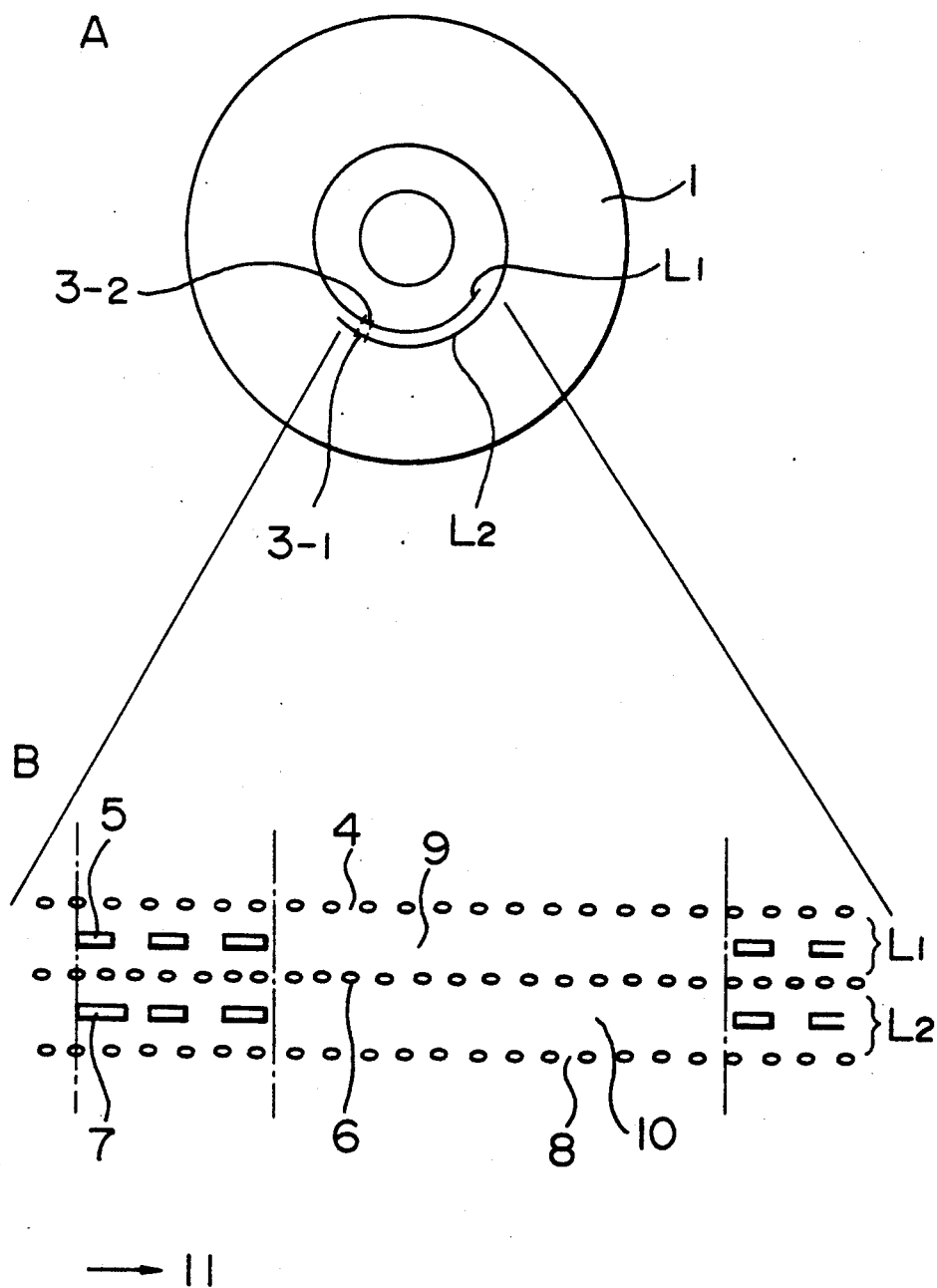
FIG. 1 is a view including a diagram (A) showing the configuration of an example of the optical disk for use in the recording/reproducing apparatus according to the present invention and an enlarged diagram (B) showing tracks L1 and L2 of the optical disk containing address signals respectively.
Figure 2:
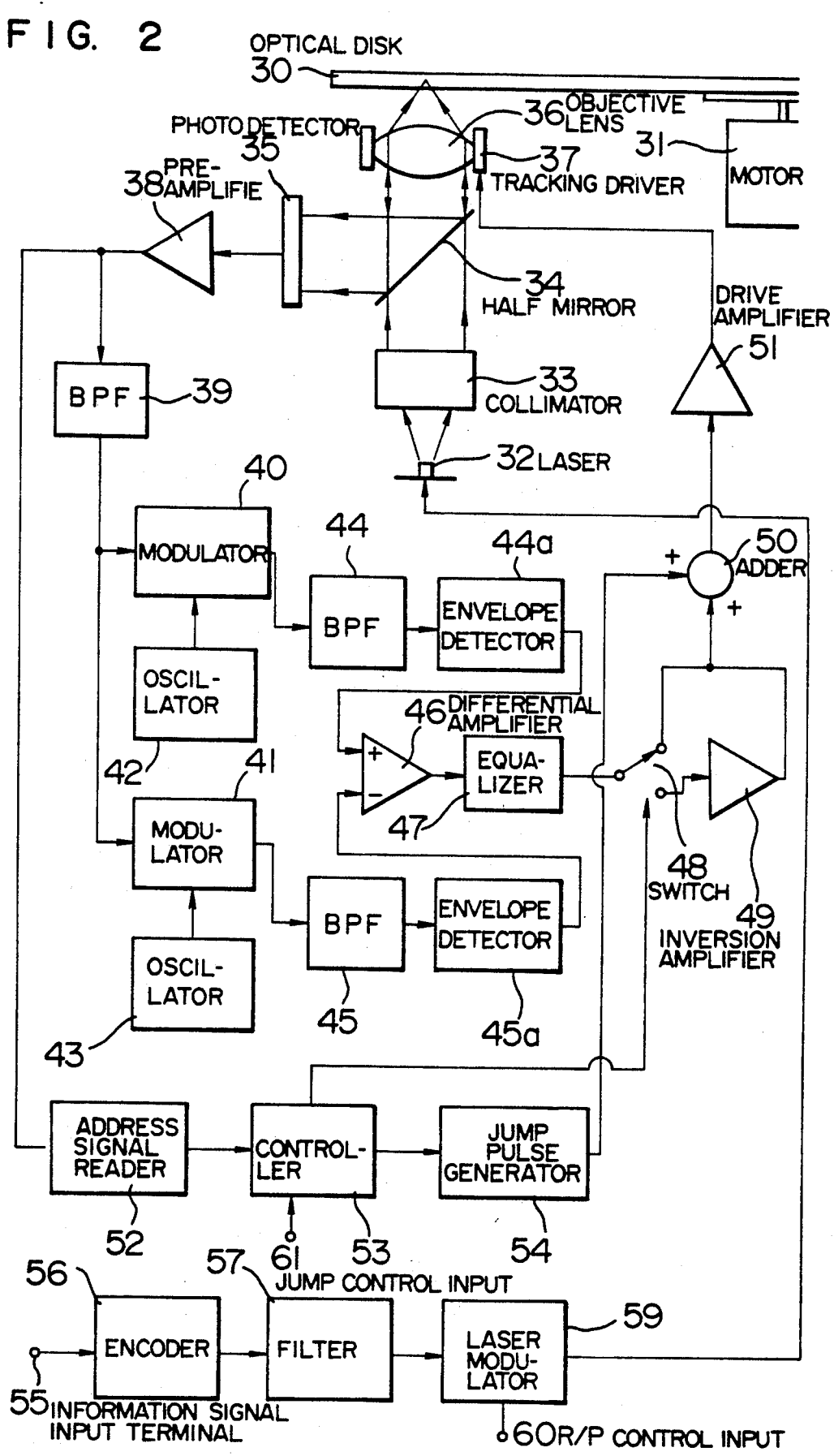
FIG. 2 is a block diagram showing an embodiment of the recording/reproducing apparatus according to the present invention.

FIG. 1 is a diagram showing an embodiment of the information recording optical disk according to the present invention, and FIG. 2 is a block diagram showing a tracking servo system to be used for the optical disk.

In the diagram (A) of FIG. 1, an optical disk 1 has tracks $L_1$ and $L_2$. The diagram (B) of FIG. 1 is an enlarged view of the tracks $L_2$ and $L_2$. The tracks $L_1$ and $L_2$ are arranged in a manner so that a series of address signals 5 and information signal recording areas 9 disposed along the track $L_1$ are sandwiched between a tracking pit row 4 of a period $T_1$ and a tracking pit row 6 of a period $T_2$, and a series of address signals 7 and information signal recording areas 10 disposed along the track $L_2$ are sandwiched between a tracking pit row 8 of a period $T_1$ and the tracking pit row 6 of a period $T_2$. The respective periods of the tracking pit rows 4, 6 and 8 are changed from $T_1$ to $T_2$, from $T_2$ to $T_1$, ... In the case where the tracking pit row of the period $T_1$ comes on the left side of one of address signals 5 (7) when viewed from the direction of an arrow 11, the one address signal 5 (7) has an ID indicating the tracking pit row of the period $T_1$.

For example, the address signal is configured to indicate a track address, it may be determined that the period of the tracking pit row on left side of the address signal is $T_1$ when the address signal indicates an odd number address.

In this case, the tracking pitch, the width of the tracking pits, and the width of the address pits may be selected to be 1.6 $\mu$m, 0.2 $\mu$m–0.3 $\mu$m, and about 0.3 $\mu$m, respectively.

Further, the depth or height of the tracking pits and the address pits may be selected to be $\frac{1}{4}n \times \lambda$ (n representing the refractive index of a protecting plate of the optical disk and $\lambda$ representing the wavelength of the laser light). Of course, it may be selected to be any other value.

Next, description will be made as to the operation of information signal recording/reproducing by using the optical disk having the configuration described above.

FIG. 2 is a block diagram showing an embodiment of the recording/reproducing apparatus according to the present invention. In the drawing, the reference numeral 30 designates an optical disk similar to that shown in FIG. 1, the rotation of which is controlled by an electric motor 31. Laser light 32 is converted into parallel light beams by a collimator 33, and the parallel light beams are supplied to an objective lens 36 through a half mirror 34 so that the objective lens 36 emits a laser beam onto a recording film on the optical disk 30. The light reflected from the optical disk 30 is reflected again by the half mirror 34, and the reflected light is converted into an electric signal by a photodetector 35. The electric signal is amplified by a preamplifier 38, and supplied to a BPF (band pass filter) 39 so as to be passed through the BPF 39 as reproduced signals representing the tracking pit rows having the periods $T_1$ and $T_2$ respectively. In this case, the frequencies $F_1$ and $F_2$ of the reproduced signals of the tracking pit rows having the periods $T_1$ and $T_2$ are selected so that those frequencies $F_1$ and $F_2$ are outside the frequency band of a signal to be recorded in the information signal recording area and that a difference between the frequencies $F_1$ and $F_2$ does not give a so large influence onto the frequency band (in order to prevent a signal representing the difference between the frequencies $F_1$ and $F_2$ from being reproduced so as to prevent any influence from being given onto the frequency band). In this embodiment, the frequencies $F_1$ and $F_2$ are selected to be 5 MHz and 5.1 MHz respectively, and, therefore, the BPF 39 is selected so as to pass the components of the frequencies 5.0 MHz and 5.1 MHz.

Modulators 40 and 41 serve to perform balancing-modulation between the output of an oscillator 42 and the output of the BPF 39 and between the output of another oscillator 43 and the output of the BPF 39 respectively. The outputs of the oscillators 42 and 43 are supplied to BPFs 44 and 45 respectively. The outputs of the BPFs 44 and 45 are applied to a differential amplifier 46 through envelope detectors 44a and 44b respectively. Each of the BPFs 44 and 45 has a pass band of ±100 KHz.

An equalizer 47 makes the response of a tracking servo system suitable. A controller 53 controls a switch 48 so as to change over the polarity of the tracking servo system by insertion or removal of an inversion amplifier 49 in the signal path between the output of the switch 48 and an input of an adder 50. The adder 50 serves to add a tracking jump pulse from a jump pulse generator 54 to the output of the switch 48. A drive amplifier 51 operates to drive a tracking driver 37 so as to make the two input signals to the differential amplifier 46 equal in amplitude to each other.

An address signal reader 52 reads the address signal of the optical disk 30, and supplies the address signal to the controller 53. The controller 53 controls the jump pulse generator 54 and the switch 48.

An information signal supplied to an information signal input terminal 55 is transmitted through an encoder 56 to a filter 57 in which the above-mentioned components of the frequencies $F_1$ and $F_2$ in the information signal are attenuated. Then, the information signal passed through the filter 57 is supplied to a laser modulator 59 which modulates the laser light 32 with the input information signal. Here, the reason why the components of the frequencies $F_1$ and $F_2$ are attenuated is to prevent a recording signal from being mixed into the reproduced signal of the tracking pits in the recording operation.

An R/P control input 60 to the laser modulator 59 determines which one of the operation modes of the laser light 32 is to be taken, the recording mode or the reproducing mode. The jump pulse generator 54 has a track jump control input 61 so that a track jump control signal is applied to the jump pulse generator 54 so that a track jump pulse is produced from the output of the track jump pulse generator 54 when track jump is to be performed.

Next, the operation of this embodiment will be described.

First, the objective lens 36 is focused by a focusing system (not shown) on the recording surface of the optical disk 30, and then the tracking driver 37 is controlled so that the components of the frequencies $F_1$ and $F_2$ appearing in the input terminals of the differential amplifier 46 are made equal to each other. That is, the components of the frequencies $F_1$ and $F_2$ of the reproduced signals of the tracking pit rows appearing in the photodetector 35 are amplified by the pre-amplifier 38, and respectively applied to the balanced modulators 40 and 41 through the BPF 39 for passing the components of the frequencies $F_1$ and $F_2$. Since the oscillation frequencies of the oscillators 42 and 43 are set to 5.0 MHz and 5.1 MHz respectively, the components each having a frequency converted into 100 KHz appear at the respective output terminals of the balanced modulators 40 and 41. The reproduced outputs of the tracking pit rows of the frequencies $DF_1$ and $F_2$ are selectively separated by the BPFs 44 and 45, and the levels of the reproduced signals are detected by the envelope detectors 44a and 44b respectively. The output levels of the envelope detectors 44a and 44b are amplitude-compared with each other by the differential amplifier 46. The output of the differential amplifier 46 is a so-called tracking error signal. The tracking error signal is supplied to the tracking driver 37 through the equalizer 47, the switch 48, the inversion amplifier 49, the adder 50, and the drive amplifier 51 so as to control the tracking driver 37 to thereby establish the tracking servo system.

As seen from FIG. 1, the positions of the tracking pit rows of the frequencies $F_1$ and $F_2$ are alternately changed over every revolution of the optical disk 1 from the left side to the right side, from the right side to the left side, and so on, with respect to the information signal recording area when viewed from the arrow 11, and therefore the polarity of the tracking servo system is changed over every revolution of the optical disk 1. In this configuration, continuous tracking servo is established also in the case where the tracks $L_1$ and $L_2$ are spirally formed.

In this embodiment, the configuration is made such that when the address number 5 is an odd one, the tracking pit row of the frequency $F_1$ and the tracking pit row of the frequency $F_2$ are located on the left side and right side, respectively, of the address number 5 when viewed from the direction of the arrow 11.

The address number is read by the address reader 52 and the switch 48 is controlled by the controller 53 so that the tracking operation can be performed in all the tracks having odd and even address numbers.

If a track jump control signal is applied to the track jump control input 61, under the control of the controller 53, the track jump pulse is applied from the track jump pulse generator 54 to the adder 50 and at the same time the switch 48 is made inoperative so that the tracking is performed on the track of the same revolution.

When an information signal 55 is to be recorded in the information signal recording area, the information signal 55 is encoded by the encoder 55, and applied to the filter 57 so that at least the components of the frequencies $F_1$ and $F_2$ are eliminated in the filter 57. Further, the information signal passed through the filter 57 is applied to the laser modulator 59 in which the laser light 32 is modulated with the information signal. As a result, any false signal is prevented from being mixed into the output of the differential amplifier 46.

The recording/reproducing operation changingover control is performed by the R/P control input 60 in a manner so that the output light of the laser light 32 is modulated and at the same time the intensity of the output light is increased in the recording operation, while the intensity of the output light is reduced in the reproducing operation.

Figure 3A:
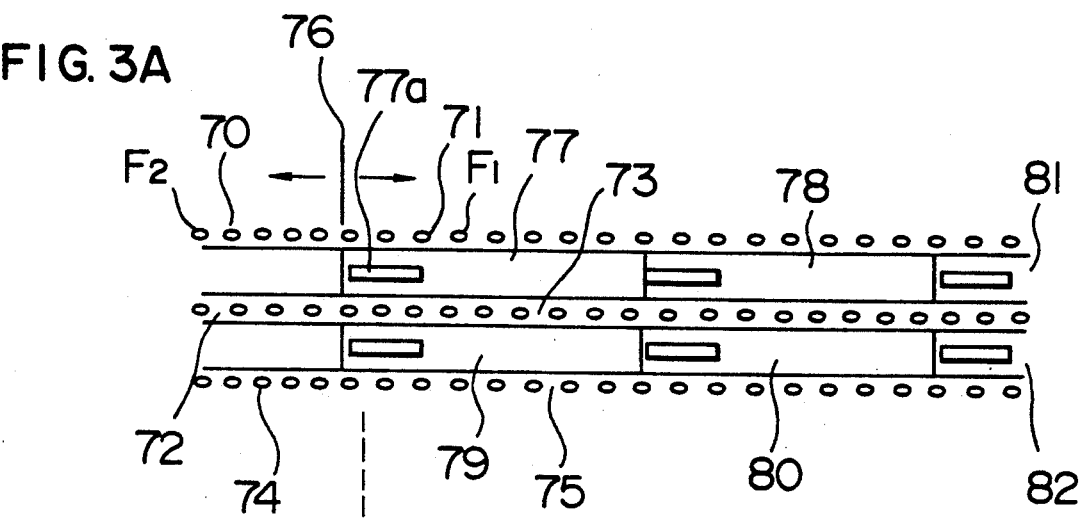
FIG. 3 is a view including an enlarged diagram 3(A) showing the vicinity of the sectors 1 and 2 in FIG. 1, and a wave form diagram 3B) showing a track jump pulse respectively.
Figure 3B:
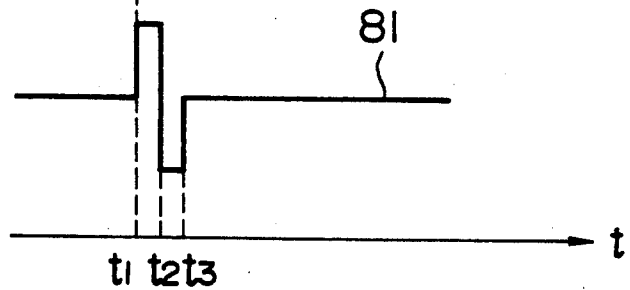

Next, the track jumping operation will be described in detail. The diagram (A) of FIG. 3 is an enlarged view of a part of FIG. 1. In this drawing, the reference numeral 70 designates a tracking pit row of the frequency $F_2$, 71 designates a tracking pit row of the frequency $F_1$, each of the reference numerals 72 and 75 designates a tracking pit row of the frequency $F_1$, and each of the reference numerals 73 and 74 designates a tracking pit row of the frequency $F_2$ (with respect to the diagram (b) of FIG. 1, the frequency of the reproduced signal of the tracking pit row having the period $T_1$ corresponds to $F_1$, the same applies to the other). The reference numeral 76 designates the start point of a first sector. Each of a track $L_1$ 81 and a track $L_2$ 82 are divided into sectors. Each of the reference numerals 77 and 79 designates a first sector, and each of the reference numerals 78 and 80 designates a second sector. Each sector is provided, at its head portion, with a track address number and a sector number.

The diagram (B) of FIG. 3 shows a wave form of the track jump pulse. In the drawing, the pulse has a positive polarity in the period from the time $t_1$ to the time $t_2$, and a negative polarity in the period from the time $t_2$ to the time $t_3$.

Next, the track jump operation will be described. The track jump operation of the recording/reproducing apparatus illustrated in the block diagram of FIG. 2 will be described by referring to FIG. 3. The tracks in he diagram (A) of FIG. 3 are spirally formed. In the drawing, tracking started from the first sector of the track $L_1$ 81 is performed through the second sector of the same, and track jump is performed from the front portion of the first sector of the track $L_2$ to the first sector of the track $L_1$. At this time, the positions of the tracking pit rows of the frequencies $F_1$ and $F_2$ are exchanged between the left side and the right side at the start point of the first sector. That is, when a track scanning light beam reaches the first sector 79, the light beam jumps to the track $L_1$ from the track $L_2$ in response to the track jump pulse shown in the diagram (B) of FIG. 3 applied to the adder 50. Since the configuration is made so that the polarity of tracking can be changed-over in accordance with the track address number provided on the front end of each sector, it is possible to change the polarity of tracking servo in synchronism with the positions of the tracking pit rows having the frequencies $F_1$ and $F_2$ immediately after the address signal of the first sector of each track has been read.

The dynamic range of the tracking servo system according to the present invention is approximately twice as wide as that of the conventional system. That is, the dynamic range according to the present invention is wide in comparison with the conventional far-field system because the polarity of the tracking error signal is not inverted in the region sandwiched between the tracking pit rows of the frequency $F_1$ and $F_2$. Accordingly, it is not necessary to detect the position of the track from the tracking error signal to thereby perform acceleration/deceleration upon track jumping.

Further, a high searching speed can be obtained when a desired track is to be searched, because the address number of the track to be searched is known in advance so that it is possible to make the polarity of tracking servo correspond to the address number to thereby make the leading-in of the tracking servo stable.

Moreover, it is possible to reduce interference between a tracking error signal and an address signal by providing a difference in depth or height between the tracking pits and the address pits. For example, the height or depth of the tracking pits may be selected to be $\frac{1}{8} n \times \lambda$, while the height or depth of the address pits may be selected to be $\frac{1}{4} n \times \lambda$.

As described above, according to the present invention, it has been made possible to detect a tracking error signal by using a single light beam and a single photodetector and to detect the center of tracks stably, because tracking pit rows different in frequency from each other are formed in an optical disk.

The dynamic range for detecting the tracking error signal can be increased to be approximately twice as wide as that of the conventional system.

The frequency band of the tracking servo system is not limited, because the tracking pit rows are continuously formed.

It is possible to provide the tracking pit rows continuously, because the frequencies of the respectively tracking pit rows for detecting a tracking error signal are selected so as not to affect a signal to be written. There is a further remarkable effect that although a difference between the two frequencies of the tracking pit rows is selected to be a small value, the level difference between the two frequencies can be easily detected because the two frequencies are subjected to balance-modulation with the outputs of oscillators having frequencies approximate to the two frequencies of the tracking pit rows.

What is claimed is:

1. A recording/reproducing apparatus for an optical disk having an information signal area and address information pits containing information indicating an address of said information signal area, said information signal area and said address information pits being disposed in a region sandwiched between a pair of tracking pit rows including tracking pits containing tracking information, a first one of said tracking pit rows including a portion having tracking pits arranged at a first frequency and a second one of said tracking pit rows including at least one portion that is disposed radially adjacent to said portion of said first one of said tracking pit rows and that includes tracking pits arranged at a second frequency different from said first frequency, said tracking pit rows having reproduction frequencies which occupy a frequency band which is different from a frequency band occupied by information signals to be recorded in said information signal area, said apparatus comprising:

optical means for projecting an optical beam onto said optical disk means, employing said optical beam for simultaneously (i) recording said information signals in said optical disk or reproducing said information signals from said optical disk and (ii) when said optical beam is reflected from said optical disk, generating optical address signals representing said information contained in said address information pits, a first optical signal representing said information contained in said tracking pits of a first one of said pair of tracking pit rows and a second optical signal representing said information contained in said tracking pits of a second one of said pair of tracking pit rows;

a tracking servo system comprising (a) first means for receiving said first and second optical signals, generating simultaneously a first electrical signal representing an amplitude of said first optical signal and a second electrical signal representing an amplitude of said second optical signal, and (b) second means for comparing amplitudes of said first and second electrical signals and for controlling said optical means to cause said optical beam to track said information signal area and said address information pits sandwiched between said pair of tracking pit rows by moving said optical beam radially of said optical disk to a position at which said amplitudes of said first electrical signal and said second electrical signal are equal to one another.

2. A recording/reproducing apparatus according to claim 1, wherein portions of said first one of said pair of tracking pit rows, that are successive to one another radially of said optical disk, alternately have said first frequency and said second frequency and portions of said second one of said pair of tracking pit rows, that are successive to one another radially of said optical disk, alternately have said first frequency and said second frequency, and said address information pits contain information for indicating whether portions of one of said tracking pit rows, between which said address information pits are disposed, have tracking pits arranged at said first frequency or at said second frequency.

3. A recording/reproducing apparatus according to claim 1, wherein said tracking servo system switches between (a) a first preset polarity corresponding to a first mode for performing a tracking operation when said first optical signal represents information contained in a portion of said first one of said tracking pit rows that has said tracking pits arranged at said first frequency and said second optical signal represents information contained in a portion of said second one of said tracking pit rows that has said tracking pits arranged at said second frequency and (b) a second preset polarity corresponding to a second mode for performing a tracking operation when said first optical signal represents information contained in a portion of said first one of said tracking pit rows that has said tracking pits arranged at said second frequency and said second optical signal represents information contained in a portion of said second one of said tracking pit rows that has said tracking pits arranged at said first frequency in response to said tracking information contained in said pair of tracking pit rows.

4. A recording/reproducing apparatus according to claim 1, wherein:
said first and second optical signals comprise first and second frequencies $F_1$ and $F_2$; and
said second means of said tracking servo system comprises:
first and second oscillators having predetermined outputs $O_1$ and $O_2$, respectively;
means for performing a first balance modulation of said first electrical signal having said frequency $F_1$ in accordance with said predetermined output $O_2$ of said second oscillator to provide a first modulated output and for performing a second balance modulation of said second electrical signal having said frequency $F_2$ in accordance with said predetermined output $O_1$ of said first oscillator to provide a second modulated output; and first and second band-pass filters receiving said first and second modulated outputs respectively, said first and second band-pass filters each comprising a band-pass frequency that is substantially equal to an absolute value of a difference between said first and second output frequencies $F_1$ and $F_2$, said first and second modulated outputs being band-pass filtered by said first and second band-pass filters, respectively, to provide band-pass filtered first and second modulated outputs constituting said first and second electrical signals.

5. A recording/reproducing system comprising:
an optical disk having an information signal area and address information pits containing information indicating an address of said information signal area, said information signal area and said address information pits being disposed in a region sandwiched between a pair of tracking pit rows including tracking pits containing tracking information, a first one of said tracking pit rows including a portion having tracking pits arranged at a first frequency and a second one of said tracking pit rows including at least one portion that is disposed radially adjacent to said portion of said first one of said tracking pit rows and that includes tracking pits arranged at a second frequency different from said first frequency, said tracking pit rows having reproduction frequencies which occupy a frequency band which is different from a frequency band occupied by information signals to be recorded in said information signal area;
optical means for projecting an optical beam onto said optical disk;
means, employing said optical beam, for simultaneously (i) recording said information signals in said optical disk or reproducing said information signals from said optical disk and (ii) when said optical beam is reflected from said optical disk, generating optical address signals representing said information contained in said address information pits, a first optical signal representing said information contained in said tracking pits of a first one of said pair of tracking pit rows and a second optical signal representing said information contained in said tracking pits of a second one of said pair of tracking pit rows;
a tracking servo system comprising (a) first means for receiving said first and second optical signals, generating simultaneously a first electrical signal representing an amplitude of said first optical signal and a second electrical signal representing an amplitude of said second optical signal, and (b) second means for comparing amplitudes of said first and second electrical signals and for controlling said optical means to cause said optical beam to track said information signal area and said address information pits sandwiched between said pair of tracking pit rows by moving said optical beam radially of said optical disk to a position at which said amplitudes of said first electrical signal and said second electrical signal are equal to one another.

6. A recording/reproducing system according to claim 6, wherein portions of said first one of said pair of tracking pit rows, that are successive to one another radially of said optical disk, alternately have said first frequency and said second frequency and portions of said second one of said pair of tracking pit rows, that are successive to one another radially of said optical disk, alternately have said first frequency and said second frequency, and said address information pits contain information for indicating whether portions of one of said tracking pit rows, between which said address information pits are disposed, have tracking pits arranged at said first frequency or at said second frequency.

7. A recording/reproducing system according to claim 5, wherein said tracking servo system switches between (a) a first preset polarity corresponding to a first mode for performing a tracking operation when said first optical signal represents information contained in a portion of said first one of said tracking pit rows that has said tracking pits arranged at said first frequency and said second optical signal represents information contained in a portion of said second one of said tracking pit rows that has said tracking pits arranged at said second frequency and (b) a second preset polarity corresponding to a second mode for performing a tracking operation when said first optical signal represents information contained in a portion of said first one of said tracking pit rows that has said tracking pits arranged at said second frequency and said second optical signal represents information contained in a portion of said second one of said tracking pit rows that has said tracking pits arranged at said first frequency in response to said tracking information contained in said pair of tracking pit rows.

8. A recording/reproducing system according to claim 5, wherein:
said first and second optical signals comprise first and second frequencies $F_1$ and $F_2$; and
said second means of said tracking servo system comprises:
first and second oscillators having predetermined outputs $O_1$ and $O_2$, respectively;
means for performing a first balance modulation of said first electrical signal having said frequency $F_1$ in accordance with said predetermined output $O_2$ of said second oscillator to provide a first modulated output and for performing a second balance modulation of said second electrical signal having said frequency $F_2$ in accordance with said predetermined output $O_1$ of said first oscillator to provide a second modulated output; and
first and second band-pass filters receiving said first and second modulated outputs respectively, said first and second band-pass filters each comprising a band-pass frequency that is substantially equal to an absolute value of a difference between said first and second output frequencies $F_1$ and $F_2$, said first and second modulated outputs being band-pass filtered by said first and second band-pass filters, respectively, to provide band-pass filtered first and second modulated outputs constituting said first and second electrical signals.

* * * * *